219-121
5/12/87 OR 4,665,296
SR

United States Patent [19]
Iwata et al.
[11] Patent Number: 4,665,296
[45] Date of Patent: May 12, 1987

[54] METHOD OF AND APPARATUS FOR IGNITING A HIGH-FREQUENCY TORCH TO CREATE A HIGH-TEMPERATURE PLASMA OF HIGH PURITY

[75] Inventors: Takashi Iwata, Fujisawa; Seiji Yokota, Hiratsuka; Yoshiaki Inoue; Tadashi Koizumi, both of Tokyo, all of Japan

[73] Assignee: Neturen Co., Ltd., Tokyo, Japan

[21] Appl. No.: 668,995

[22] Filed: Nov. 5, 1984

[30] Foreign Application Priority Data

Apr. 28, 1984 [JP] Japan .................... 59-85127
May 25, 1984 [JP] Japan .................... 59-104419

[51] Int. Cl.[4] .................... B23K 15/00
[52] U.S. Cl. .................... 219/121 PR; 219/121 PY; 219/121 PG; 315/111.51; 315/330; 315/331; 313/594; 313/146
[58] Field of Search ...... 219/121 P, 121 PY, 121 PG, 219/121 PR; 315/111.41, 111.51, 330, 331; 313/106, 107, 146, 601, 231.31, 594, 231.417; 204/164, 192 E

[56] References Cited

U.S. PATENT DOCUMENTS 3,353,060 11/1967 Yamamoto et al. .................... 315/331
3,997,816 12/1976 Haugsjaa et al. .................... 315/331
4,386,258 5/1983 Akashi et al. .................... 315/111.51
4,448,799 5/1984 Bergman et al. .................... 313/146

OTHER PUBLICATIONS

Thesis of Japanese Electric Society, Koji Nomoto and Masanori Akazaki, May 1973, (vol. 93-A, No. 5), chapters 1 and 2 translated.

*Primary Examiner*—M. H. Paschall
*Attorney, Agent, or Firm*—Wenderoth, Lind & Ponack

[57] ABSTRACT

An ignition element for use in igniting a high-frequency plasma torch is ungrounded and displaceable. When a tip end of the ignition element is positioned in a location in a gas to be formed into a plasma, which flows under normal pressure, and a high-frequency energy is applied to the above location in the gas flow, the gas is ignited into a high-temperature plasma in a small period of time shorter than 1 second. After the gas has been ignited, the ignition element is immediately retracted out of the location. The ignition element may be in the form of an ignition rod of metal or an ignition tube of quartz or the like. Where the ignition rod is used, it instantaneously contacts the high-temperature plasma upon ignition so that the high-temperature plasma is of high purity consisting only of the component of the gas. The ignition tube may be used for producing a high-temperature plasma of higher purity on and after ignition. The ignition tube is employed while a pressure therein is reduced. A glow discharge is generated in the ignition tube of the reduced pressure by applying the high-frequency energy, and the gas flowing outside of the tube is ignited by the glow discharge into a plasma.

3 Claims, 8 Drawing Figures

METHOD OF AND APPARATUS FOR IGNITING A HIGH-FREQUENCY TORCH TO CREATE A HIGH-TEMPERATURE PLASMA OF HIGH PURITY

BACKGROUND OF THE INVENTION

The present invention relates to plasma technology in class H05H of International Patent Classification.

FIG. 1 of the accompanying drawings illustrates a conventional high-frequency plasma torch T with a grounded carbon rod. The plasma torch T comprises a double-walled tubular torch body 100 composed of a larger-diameter outer tube 101 made of a heat-resistant material such for example of quartz and a smaller-diameter inner tube 102, a high-frequency induction coil C wound around the tubular torch body 100, and an ignition device L.

The outer tube 101 has a closed end and an opposite open end opening into a chamber ch for introducing a high-frequency plasma generated in the torch body 100 into the chamber ch to effect various actions therein. The inner tube 102 also has a closed end and an opposite open end, and extends through the closed end of the outer tube 101. The inner tube 102 includes a portion closer to the closed end, disposed outside of the outer tube 101, and a portion closer to the open end, disposed within the outer tube 101. The inner tube 102 is disposed concentrically with the outer tube 101 with the open end of the inner tube 102 being open in the outer tube 101. Conduit tubes open respectively into the outer and inner tubes 101, 102 in the vicinity of the closed ends thereof. The conduit tube connected to the inner tube 102 serves to supply a core gas G1 to be formed into a plasma into the inner tube 102, and the conduit tube connected to the outer tube 101 serves to supply a tube wall cooling gas G2 which is the same quality as that of the core gas G1, for example.

The high-frequency induction coil (hereinafter referred to as a "coil") C is wound around the torch body 100 adjacent to a position where the inner tube 102 opens in the outer tube 101 and where the torch body 100 is single-walled, and is connected to a high-frequency power supply E which produces an output of a predetermined frequency.

The ignition device L comprises an ignition carbon rod Lb of a small diameter, a sheath Ls by which the carbon rod Lb is supported, and a conductive wire Lc by which the carbon rod Lb is grounded. The carbon rod Lb is fitted in the sheath Ls such that a certain length of the carbon rod Lb is exposed out of the sheath Ls. The sheath Ls extends coaxially through the closed end of the inner tube 102 such that the exposed carbon rod Lb has a distal end positioned in the portion of the torch body 100 where the coil C is wound. The conductive wire Lc has one end connected to an end of the carbon rod Lb which is located outside of the torch body 100, with the other end of the wire Lc grounded.

The theory of ignition according to the above conventional ignition arrangement with the grounded carbon rod is as follows: When a high-frequency current starts being passed through the coil C while the core gas G1 is being introduced into the inner tube 102, an eddy current is induced in the carbon rod Lb due to a magnetic flux generated by the coil C thereby to heat the carbon rod Lb. The heated carbon rod Lb promotes ionization of the core gas G1. The core gas G1 is then ignited by a sparking voltage—a silent discharge starting voltage due to an electric field generated radially of the coil between the ground ignition rod Lb of a lower potential and the coil C of higher potential.

In the conventional ignition arrangement with the grounded carbon rod, it is required to ground the carbon rod Lb.

With the prior ignition arrangement with the grounded carbon rod, the carbon rod Lb is fitted in the sheath Ls and has its distal end placed in the high-frequency energy region after ignition. Therefore, the distal end of the carbon rod Lb is always held in contact with the tip of a high-temperature plasma fire indicated by P in FIG. 1. Since carbon is melted and mixed into the plasma, it is difficult to obtain a highly pure plasma fire P consisting of the component of the core gas G1. Furthermore, a few seconds has been required until the ignition occurs.

Examples in which a highly pure plasma fire P is required are as follows: Where the core gas G1 is of $N_2$ and the plasma fire P acts on a bulk of titanium (Ti) to produce fine particles of titanium nitride, 10 to 30% of the fine particles produced by the plasma torch T of a conventional ignition apparatus L is no made of titanium nitride but titanium carbide. Therefore, no desired purity of products can be ensured. Where a rod of Ti is used in place of the carbon rod, it is held in contact with the high-temperature plasma fire having at least a temperature of 10,000 K. as long as the prior ignition arrangement with the grounded rod, with the result that the rod material will be melted.

SUMMARY OF THE INVENTION

It is an object of the present invention to provide a method of and an apparatus for igniting a high-frequency plasma torch reliably within a period of time shorter than a second to create a high-temperature plasma of high purity.

According to the present invention, there is provided a method of igniting a plasma torch, under normal pressure, to generate a high-temperature plasma fire by applying a high-frequency energy produced by a high-frequency induction coil wound around a region of a tube to a core gas introduced into the tube, the method comprising the steps of providing an ungrounded ignition element displaceable into and out of the high-frequency energy applying region, positioning the ignition element in a flow of the core gas in the region for ignition, igniting the core gas into a plasma, and retracting the ignition element away from the high-frequency energy region immediately after the core gas has been ignited so as to be separated from a high-temperature plasma fire. The ignition element may comprise an ignition rod or an ignition tube for different advantages.

Where the ignition rod is used for the ignition element, the ignition rod may comprise a carbon rod or a metal rod. When the core gas is ignited, the ignition rod is displaced into the high-frequency energy applying region for direct contact with the core gas flowing along the outer periphery of the ignition rod to thereby apply a high-frequency energy to ignite the core gas into the plasma.

Where the ignition tube is used, it may be made of a heat-resistant material such as quartz and in the form of a hollow thin tube having one sealed end with a pressure therein being reduced or reduceable. When the core gas is ignited, the ignition tube is positioned in the high-frequency energy applying region in the flow of the core gas to apply a high-frequency energy to the interior of the tube kept under reduced pressure, for thereby producing a glow discharge which ignites the core gas outside of the ignition tube.

The above ignition method has been achieved by a number of experiments conducted by the inventor to achieve a high-purity, high-temperature plasma fire, and has not yet been theoretically analyzed. While the conventional ignition apparatus with the grounded carbon rod takes about 3 to 5 seconds after a high-frequency current starts being passed through a coil until the core gas is ignited, the ignition apparatus of the invention with an unground carbon rod is capable of igniting the core gas within a much shorter period of time as compared with the prior ignition apparatus. In experiments in which the ignition rod is made of titanium, tungsten, iron, ferro alloy, copper or the like, the core gas is reliably ignited within substantially the same period of time. Since the time required for igniting the core gas is dependent on the component of the core gas and matching condition of the coil, the time cannot be given on a quantitative basis. However, where the ignition rod of any one of the metals referred to above is used, the core gas can be ignited in a time shorter than 1 second. In case the ignition tube is used, the ignition time is even shorter such that the core gas can instantaneously be ignited within a period which allows the operator to barely confirm a glow discharge generated in the ignition tube.

Furthermore, the ignition rod or tube is retracted away from the high-frequency energy region immediately after the core gas has been ignited. Where the ignition rod is used, it is instantaneously retracted such that it contacts the tip of the plasma fire only in a time shorter than 1 second when the core gas is ignited. After the ignition of the core gas, therefore, no metal of the ignition rod is mixed into the plasma, and hence a plasma of high purity consisting only of the core gas component can be created. Where the ignition tube is employed, the temperature of the tip of the plasma fire is not so high, the ignition tube is not made of metal, and it is not heated by itself due to induction heating with no possibility of being melted and evaporated, even when the ignition tube is held in contact with the tip of the plasma fire in a time shorter than 1 second. Therefore, a high-temperature plasma of high purity consisting of the core gas component can be generated upon and after ignition.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5(*b*) and 5(*c*) are cross-sectional views illustrative of operation of the ignition apparatus shown in FIG. 5(*a*) which is mounted on a plasma torch.

DESCRIPTION OF THE PREFERRED EMBODIMENTS

Figure 1:
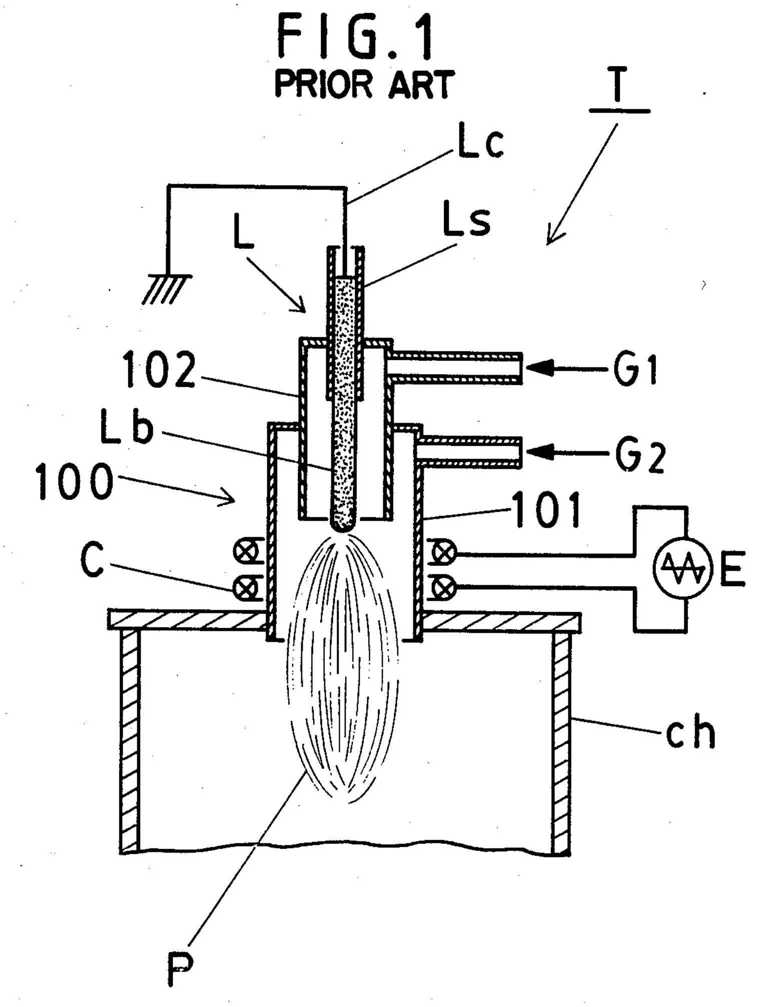
FIG.1 PRIOR ART
FIG. 1 is a cross-sectional view of a high-frequncy plasma torch of a conventional ignition arrangement with a grounded carbon rod.
Figure 2:
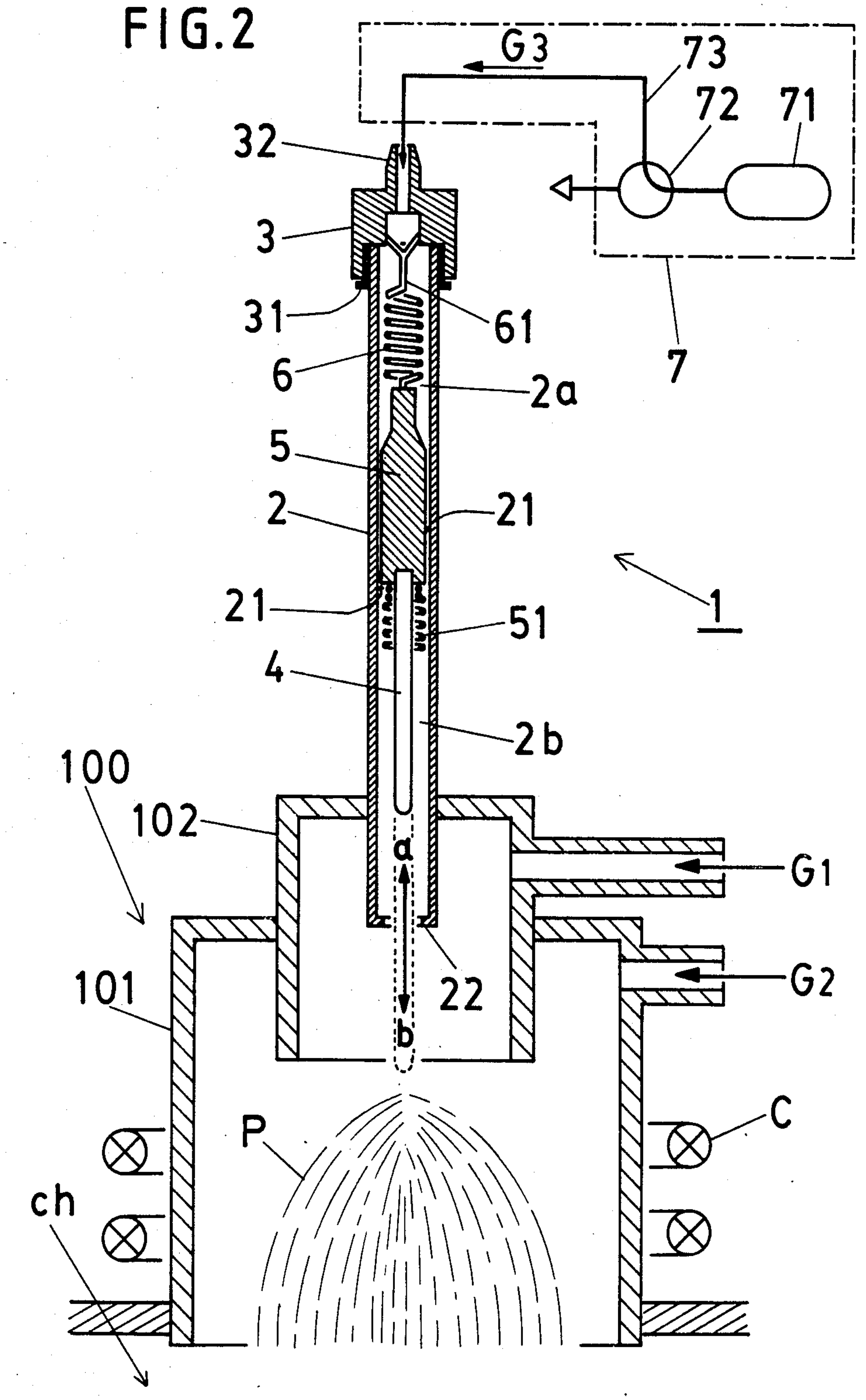
FIG. 2 is a cross-sectional view of a plasma torch having an ignition apparatus with an ungrounded metal rod according to the present invention.

FIG. 2 shows a plasma torch having an ingnition apparatus with an ignition rod.

The ignition apparatus with an ungrounded ignition rod is designated generally at 1 in FIG. 2. The ignition apparatus 1 includes a sheath 2 having one end hermetically sealed and closed by a cap 3 fitted through a seal member 31 on the end and an opposite open end, the sheath 2 having a predetermined length and an predetermined inside diameter. The ignition apparatus 1 also has an ignition rod 4 of metal shorter than the sheath 2 and having an outside diameter smaller than the inside diameter of the sheath 2, and a displacement mechanism for displacing the ignition rod 4.

The sheath 2 extends through the closed end of an inner tube 102 of a torch body 100 such that the closed end of the sheath 2 is disposed outside of the torch body 100 and the open end thereof opens into the inner tube 102.

The displacement mechanism comprises a slider 5 doubling as a counterweight having a diameter slightly smaller than the inside diameter of the sheath 2, a tension coil spring 6 of such a diameter as to disposed in the sheath 2 and having a predetermined spring constant, and a drive gas supply unit 7. A support member 61 is supported on an inner wall of the cap 3 and has one end from which one end of the tension coil spring 6 depends, the other end of the tension coil spring 6 being fixed to an end of the slider 5. The ignition rod 4 is accommodated in the sheath 2 such that one end of the ignition rod 4 is fixed to the other end of the slider 5, and the other end of the ignition rod 4 is positioned in the vicinity of an open end of the sheath 2. The interior of the sheath 2 is divided by the slider 5 spaced from an inner wall surface of the sheath 2 by a small clearance 21 into a closed-end chamber **2*a* in which the tension coil spring 6 is housed and an open-end chamber 2*b*. The drive gas supply unit 7 is composed of a drive gas supply 71 capable of supplying a gas G3 which is the same as a core gas G1, a directional control valve 72 such as a three-port valve, and a line 73 interconnecting the drive gas supply 71 and a nipple 32 mounted centrally on the top of the cap 3, the directional control valve 72 being disposed in the line 73. The open end of the sheath 2 has a stopper 22 in the form of a flange, for example. A dampening compression spring 51, if desired, is mounted on the other end of the slider 5**.

The pressure of the drive gas G3, the weight of the slider 5, the weight and length of the ignition rod 4, the spring constant of the tension coil spring 6, and other parameters are selected as prescribed values. When the directional control valve 72 is operated to introduce the drive gas G3 from the drive gas supply 71 into the chamber **2*a* in the sheath 2, the gas pressure in the chamber 2*a* is progressively increased although a small amount of the drive gas G3 leaks through the clearance 21. When the gas pressure in the chamber 2*a* exceeds the spring force of the tension coil spring 6, the slider 5** is moved toward the open end of the sheath 2 while extending the tension coil spring 6. As a result, the chamber *2a* is expanded while the chamber *2b* is reduced, and at the same time the ignition rod 4 is displaced in the direction of the arrow b until substantially the full length of the ignition rod 4 is exposed out of the sheath 2, whereupon the distal end of the ignition rod 4 enters a high-frequency energy applying region within the torch body 100 around which a coil C is wound. When the directional control valve 72 is operated to close the drive gas supply 71 and open the line 73, the drive gas G3 is quickly discharged out of the chamber *2a*. The gas pressure in the chamber *2a* is then lowered to allow the tension coil spring 6 to be contracted to move the slider 5 toward the closed end of the sheath 2. As a consequence, the chambers *2a, 2b* return to their initial conditions with the ignition rod 4 fully withdrawn into the sheath 2 in the direction of the arrow a.

Operation for igniting a plasma torch T with the ignition apparatus 1 having the ungrounded ignition rod of the invention will be described.

While the coil C is de-energized, the core gas G1 starts to be introduced into the inner tube 102 of the torch body 100. Then, the directional control valve 72 is operated to supply the drive gas G3 into the chamber *2a* in the sheath 2. As the drive gas G3 is introduced, the ignition rod 4 is progressively brought out of the sheath 2 in response to movement of the slider 5 in the sheath 2 until the distal end of the rod 4 is positioned in the high-frequency energy applying region. Under this condition, the coil C starts being energized by the high-frequency power supply E to ignite the core gas G1 to create a high-temperature plasma fire P. At this time, the ignition is promoted by a small flow of the drive gas G3 having leaked through the clearance 21 and ejected along the ignition rod 4.

Immediately after the ignition, the directional control valve 72 is operated to stop the supply of the drive gas G3 into the chamber *2a* and to discharge the drive gas G3 from the chamber *2a*. The ignition rod 4 is displaced in the direction of the arrow a back into the sheath 2 away from the high-temperature plasma fire P. Then, the directional control valve 72 is shifted to a neutral position to close the line 73, whereupon the ignition process is completed.

In the above ignition process, the ignition rod 4 is kept in contact with the plasma fire P only upon ignition for a small period of time shorter than 1 second, and is retracted out of contact with the plasma fire P after the ignition. The plasma fire P after being ignited is therefore of a high purity, consisting only of the component of the core gas G1.

It is found that the following phenomenon occurs at times while the above ignition process is repeated many times.

Figure 3A:
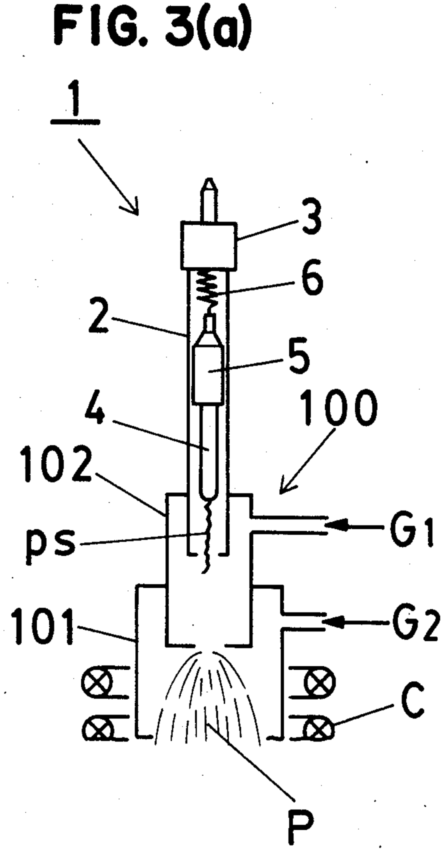
FIGS. 3(*a*) and 3(*b*) are schematic cross-sectional views explanatory of a problem occuring during operation of the ignition apparatus shown in FIG. 2.
Figure 3B:
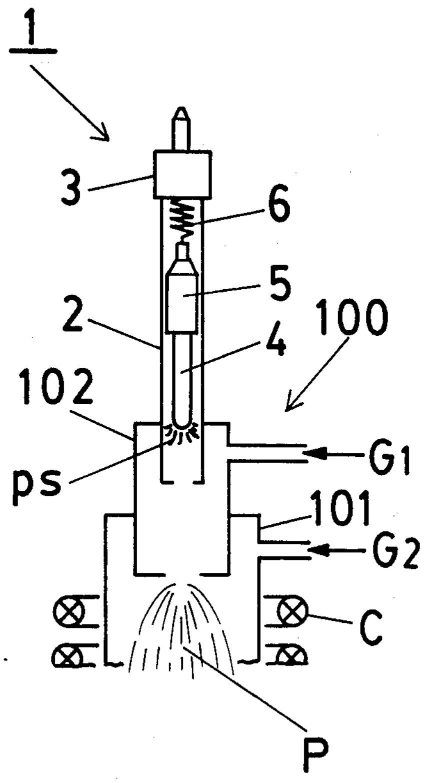

When the ignition rod 4 is quickly separated from the plasma fire P after its distal end has reached the high-frequency energy region on ignition, the ignition rod 4 as withdrawn into the sheath 2 is sometimes subjected to a tail-shaped discharge ps as shown in FIG. 3(*a*) or a brush-shaped discharge ps as shown in FIG. 3(*b*). The discharge ps may be sustained for a long period of time, or may be eliminated of its own accord after it has continued for a few minutes. While the discharge is being present, the ignition rod 4 is heated by the discharge and liable to be melted and mixed into the plasma. When this occurs, then the plasma is difficult to keep its desired high purity. (With the conventional ignition arrangement, however, no such discharge is produced since the carbon rod remains in contact with the plasma fire P.)

The inventor has conducted various experiments in an effort to solve the above problem, and has found that a small flow of gas which is less ionizable than the core gas G1 and which is instantaneously allowed to flow axially along the periphery of the ignition rod 4 as it is displaced out of the high-frequency energy region away from the plasma fire P after the ignition is highly effective in eliminating the discharge.

More specifically, such a gas which is less ionizable than the core gas G1 is caused to flow through the clearance 21 between the inner wall surface of the sheath 2 and the outer peripheral surface of the slider 5.

Figure 4:
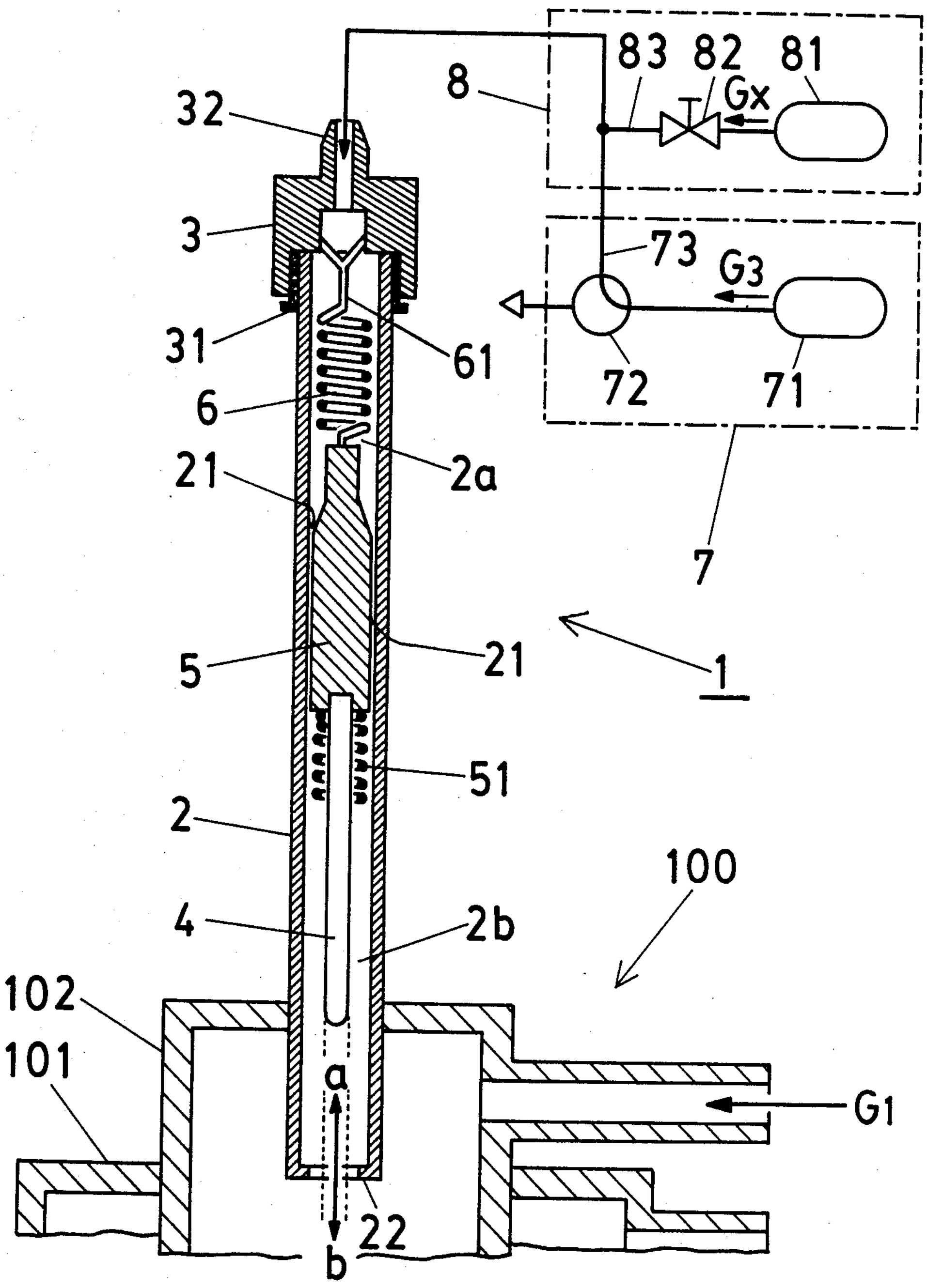
FIG. 4 is a cross-sectional view of an ignition apparatus with an ungrounded metal rod according to another embodiment of the present invention, the ignition apparatus being an improvement over the ignition apparatus of FIG. 2.

FIG. 4 shows an arrangement in which a device for eliminating a discharge after ignition is added to the ignition apparatus 1 of FIG. 2.

Like or corresponding parts of the ignition apparatus 1 shown in FIG. 4 are denoted by like or corresponding reference characters in FIG. 2. The chamber *2a* in the sheath 2 is supplied through the nipple 32 with two different gases. More specifically, the gases are supplied from the drive gas supply unit 7 and a discharge eliminating gas supply unit 8. The discharge eliminating gas supply unit 8 is composed of a gas supply 81 for supplying a discharge eliminating gas Gx which is less ionizable than the core gas G1, and a line 83 in which a valve 82 is disposed. The line 83 has one end connected to the gas supply 81 and an opposite end to the line 73 downstream of the directional control valve 72 in the drive gas supply unit 7. The discharge eliminating gas Gx is supplied at a flow rate sufficiently smaller than the flow rate of the drive gas G3 ($Gx << G3$), and hence the pressures of these gases in the chamber *2a* are $Gx << G3$. Where the core gas G1 and the drive gas G3 are of argon (Ar), then the discharge eliminating gas Gx is of N2. In case the core gas G1 is of a mixed gas, then the discharge eliminating gas Gx is of a single or mixed gas which is less ionizable than the mixed core gas.

The torch T will be ignited by the ignition apparatus 1 shown in FIG. 4 as follows:

With the valve 82 closed, the core gas G1 is ignited to create a plasma in the same manner as described above, uzing the drive gas supply unit 7. When there is no discharge ps generated at the time the ignition rod 4 is retracted out of the high-frequency energy region after the ignition, the directional control valve 72 is brought to a neutral position to finish the ignition process. If however there is produced a discharge ps as shown in FIG. 3(*a*) or 3(*b*) at the tip end of the ignition rod 4, then the directional control valve 72 is shifted to the neutral position, and then the valve 82 is immediately opened to supply the discharge eliminating gas Gx from the gas supply 81 into the line 83, from which the gas Gx is introduced into the chamber *2a*. Since the pressure of the gas Gx is much smaller than the pressure of the gas G3 ($Gx << G3$), the pressure of the gas Gx flowed into the chamber *2a* is not strong enough to displace the slider 5 against the force of the tension coil spring 6, but is allowed to leak through the clearance 21. The leaked gas Gx flows in the chamber *2b* along the ignition rod 4 toward the open end of the sheath 2 until the gas Gx reaches the tip end of the ignition rod 4, whereupon the gas Gx instantaneously eliminates the discharge ps. After the discharge ps is eliminated, the valve 82 is closed to complete the ignition process.

By thus igniting the plasma torch T with the ignition apparatus having the ungrounded ignition rod, as shown in FIG. 4, the generated plasma will not be contaminated by any discharge which may be produced.

The ignition apparatus 1 may be manually operated by the operator while the operator is visually checking the operation of the appararus, or may be automatically operated by controlling the directional control valve 72 and the valve 83 with output signals issued from a known detector which can detect the ignition of a plasma fire P and the generation of a discharge.

The displacement mechanism for displacing the ignition rod 4 and the drive supply unit 7 shown in FIGS. 2 and 4 are illustrated by way of example only, and may not be limited to the illustrated construction but may be of other arrangements within the scope and spirit of the present invention.

Figure 5A:
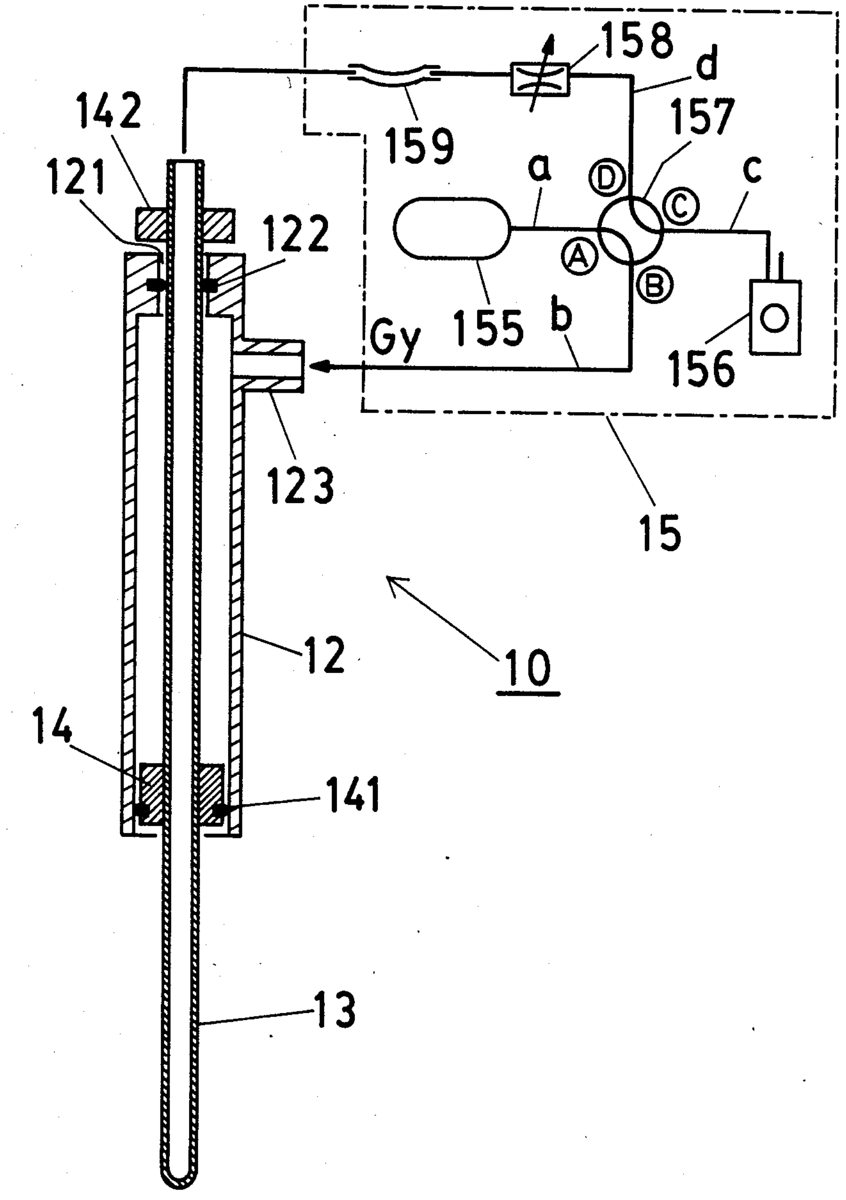
FIG. 5(*a*) is a cross-sectional view of an ignition apparatus with an ungrounded ignition tube according to still another embodiment of the invention.
Figure 5:
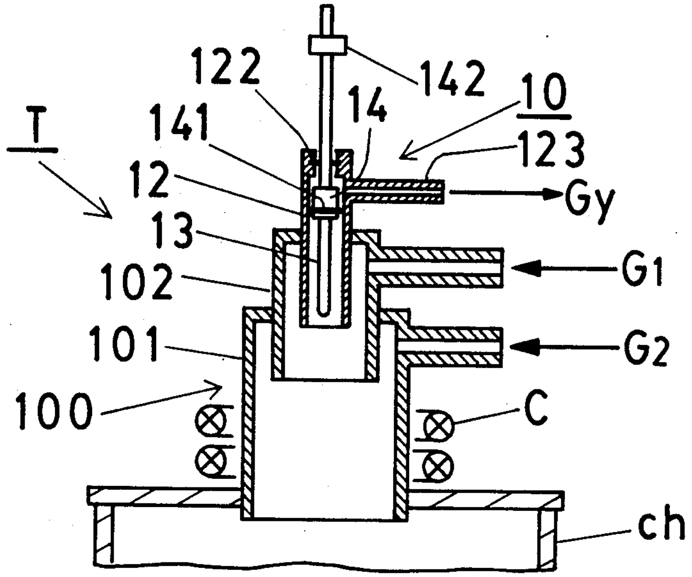
Figure 5:
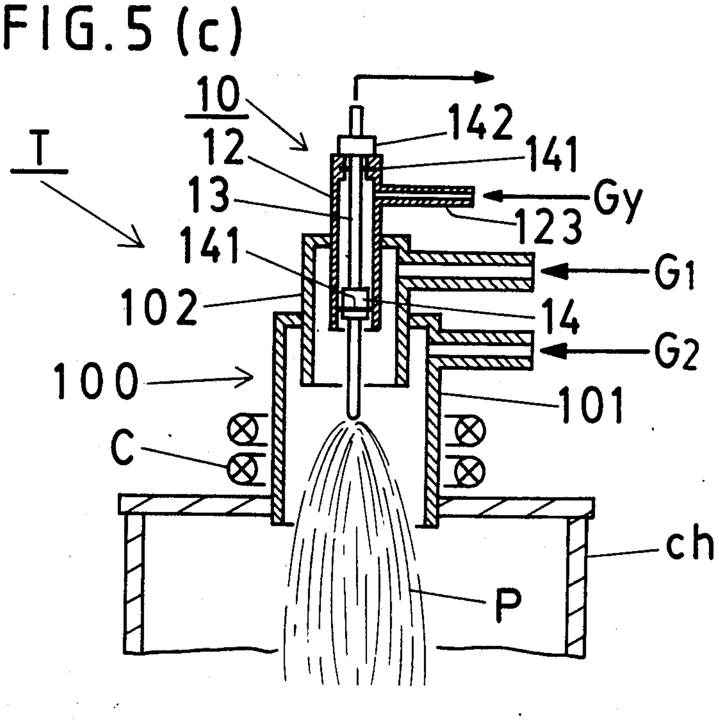

For producing a plasma fire of higher purity, the inventor has devised another ignition apparatus in which an ungrounded ignition tube is used. FIG. 5(*a*) illustrates such a ignition apparatus with an ungrounded ignition tube.

The ignition apparatus, generally designated at 10, essentially comprises a sheath 12, an ignition tube 13, a slide block 14, and a control mechanism 15.

The sheath 12 has a predetermined length and a predetermined inside diameter, and extends through a closed end of the inner tube 102, for example, of the torch body 100 (FIGS. 5(*b*) and 5(*c*)). The sheath 12 has one end disposed outside of the inner tube 102 and having a through hole 121 of a given diameter, and an opposite open end disposed within the inner tube 102.

The ignition tube 13 extends through the sheath 12 and is made of a heat-resistance material such as quartz, ceramics, hard glass, for example. The ignition tube 13 is longer than the sheath 12 and in the form of a hollow thin tube insertable through the hole 121 in the sheath 12. The ignition tube 13 has an open end disposed outside of the sheath 12, and an opposite closed or sealed end normally disposed within the sheath 12.

The slide block 14 is concentrically disposed around and fixed to a portion of the ignition tube 13 within the sheath 12. The slide block 14 has an outside diameter slightly smaller than the inside diameter of the sheath 12 and has a circular groove defined in an outer peripheral surface thereof, with a sliding O-ring 141 mounted in the circular groove for sliding movement against an inner wall surface of the sheath 12. A wall surface of the sheath 12 which define the through hole 121 also has a circular groove defined therein with a sliding O-ring 122 mounted therein. The ignition tube 13 is slidable against the sliding O-ring 122.

The interior of the sheath 12 which is defined between the slide block 14 fixed to the ignition tube 13 and the end of the sheath 12 which is closed by the ignition tube 13, is hermetically sealed by the sliding O-rings 122, 141, with the ignition tube 13 being kept coaxially with the sheath 12.

The control mechanism 15 comprises a control gas supply 155 for supplying a control gas Gy such as nitrogen or air, an evacuating device 156 such as a hydraulic pump, and a directional control valve 15 such as a four-port valve. The directional control valve 15 is normally arranged such that its port A is connected to a line a connected to the control gas supply 155, its port B is connected to a line b connected to a nipple 123 mounted on the sheath 12 adjacent to the closed end thereof, its port C is connected to a line c connected to the evacuating device 156, and its port D is connected to a line d connected to the open end of the ignition tube 13. The line d has a regulator 158 and a flexible coupling 159. Whe the ports A through D are arranged as shown in FIG. 5(*a*) by operating the directional control valve 157 so that the lines a, b are connected and the lines c, d are connected, the control gas Gy is supplied from the control gas supply 155 into the sheath 12, and at the same time the interior of the ignition tube 13 is evacuated by the evacuating device 156. When the directional control valve 157 is operated to connect the lines a, d and the lines b, c, the interior of the sheath 12 is evacuated by the evacuating device 156 and the control gas Gy is supplied from the control gas supply 155 into the ignition tube 13.

When the gas pressure in the hermetically sealed interior of the sheath 12 between the sliding O-rings 122, 141 is reduced by operating the directional control valve 15, the slide block 14 can be slid from the position close to the open end of the sheath 12 toward the closed end thereof. Conversely, when the control gas Gy is supplied into the interior of the sheath 12 which is reduced by the slide block 14 located closely to the closed end of the sheath 12, the gas pressure in the sheath interior is increased to move the slide block 14 toward the open end of the sheath 12. The movement of the slide block 14 toward the open end of the sheath 12 causes the ignition tube 13 to move axially of the sheath 12.

The regulator 158 connected in the line d serves to prevent the control gas Gy supplied into the ignition tube 13 from being pressurized beyond a normal pressure and thus damaging the ignition tube 13. The flexible coupling 159 allows movement of the ignition tube 13.

The length of the ignition tube 13, the position where the slide block 14 is fixed to the ignition tube 13, the position of a stopper 142 mounted on the ignition tube 13 closely to the open end thereof, the pressure of the control gas Gy, and other parameters are selected as prescribed values. When the control gas Gy is supplied into the sheath 12, a length of the ignition tube 13 close to the sealed end thereof is exposed out of the sheath 12 to cause the tip end of the tube 13 to enter a high-frequency energy applying region in the torch body 100. When the gas pressure in the sheath 12 is reduced, the length of the ignition tube 13 is instantaneously retracted into the sheath 12.

Operation for igniting a plasma torch T with the igniting apparatus shown in FIG. 5(*a*) will be described with reference to FIGS. 5(*b*) and 5(*c*).

The directional control valve 157 in the control mechanism 15 is operated to connect the lines a, d and the lines b, c to keep the interior of the ignition tube 13 under normal pressure while reducing the pressure within the sheath 12. Then, the core gas G1 is introduced into the inner tube 102 of the torch body 100, as shown in FIG. 5(*b*). Then, the directional control valve 157 is operated to connect the lines a, b and the lines c, d to allow the control gas Gy to flow into the sheath 12. The distal end portion of the ignition tube 12 is exposed out of the sheath 12 to the flow of the core gas G1, and the tip end of the ignition tube 12 enters the high-frequency energy applying region. The interior of the ignition tube 12 is simultaneously evacuated by the evacuating device 156. When the interior of the ignition tube 12 is progressively evacuated to a pressure of 1 Torr or less, the high-frequency power supply E is turned on to energize the coil C. A glow discharge is immediately produced within the ignition tube 13 which is evacuated. Upon generation of the glow discharge, the core gas G1 flowing outside of the ignition tube 13 is ignited in a short period of time shorter than 1 second to produce a high-temperature plasma fire P. Where the coil C has good matching, the ignition time is so small that the operator is unable to visually confirm the generation of the glow discharge.

No theoretical explanation has yet been given as to why the glow discharge within the ignition tube 13 serves to ignite the flow of the core gasd G1 outside of the ignition tube 13 into the high-temperature plasma fire P. However, electrons or charged particles generated by the glow discharge may probably pass through the tube wall of the ignition tube 12 into the flow of the core gas G1 and impinges upon molecules of the core gas G1 which have been excited by the high-frequency energy, thus starting off ionization.

After the core gas G1 has been ignited, the directional control valve 157 is immediately operated to connect the lines a, d and the line b, c to supply the control gas Gy into the ignition tube 13. The gas pressure is increased in the ignition tube 13 to eliminate the glow discharge therein. Since the control gas Gy is simultaneously removed from the sheath 12, the ignition tube 13 is withdrawn back into the sheath 12 away from the generated high-temperature plasma fire P, whereupon the ignition process is completed.

With the ignition apparatus 10 shown in FIGS. 5(*a*) through 5(*c*), the ignition tube 13 is retracted away from the high-temperature plasma fire P immediately after the ignition through a simple operation. Therefore, the generated high-temperature plasma fire P is kept highly pure, consisting only of the component of the core gas G1 upon and after the ignition.

The distance that the ignition tube 13 of the ignition apparatus 10 is retracted away from the high-temperature plasma fire P is smaller than the distance that the ignition rod 4 of the ignition apparatus 1 (FIGS. 2 and 4). Therefore, the ignition apparatus 10 may be smaller in size.

While in the above embodiment of FIG. 5(*a*) the directional control valve 157 comprises a four-port valve, it may be of an arrangement having valves for respectively evacuating the sheath 12 and supplying the control gas Gy into the sheath 12, and evacuating the ignition tube 13 and supplying the control gas Gy into the ignition tube 13, or other arrangements not limited to the illustrated construction. However, the illustrated construction is preferable in that is can simultaneously and instantaneously effect switching between pressurization and evacuation of the ignition tube 13 and the sheath 12, rapid retraction of the ignition tube 13 away from the high-temperature plasma fire P, and elimination of the glow discharge in the ignition tube 13.

The ignition apparatus 10 may be arranged such that it has no sheath 12 and no control gas supply 155, but the ignition tube 13 is displaced into and out of the high-frequency energy applying region by a displacement mechanism employing the ignition tube 13 connected by the line to the evacuating device 156.

The ignition tube 13 in the ignition apparatus 10 may be in the form of a sealed tube with its interior kept under a reduced pressure in advance, and the core gas G1 may be ignited by causing the tip end of the sealed tube to enter the high-frequency energy applying region mechanically or manually. After the ignition, however, the glow discharge generated in the ignition tube cannot be eliminated unless and until the sealed tube is quickly separated a sufficient distance from the high-frequency energy region.

With the above ignition apparatus with any of the foregoing alternatives, the ignition process can automatically be effected by incorporating a detector mechanism in the ignition apparatus having the ungrounded ignition tube.

Although certain preferred embodiments have been shown and described, it should be understood that many changes and modifications may be made therein without departing from the scope of the appended claims.

What is claimed is:

1. An apparatus for igniting a plasma torch to produce a high-temperature plasma fire of high purity, comprising an ignition mechanism for igniting a plasma torch to generate a high-temperature plasma fire by applying a high-frequency energy produced by a high-frequency induction coil wound around a region of a tube to a core gas introduced into the tube, said ignition mechanism comprising:

(a) a sheath having a predetermined length and a predetermined inside diameter, said sheath having a closed end with a through hole of a predetermined diameter and an opposite open end, said closed end being positioned outside of said tube and said open end extending in said tube toward a position in the vicinity of said region of said tube;

(b) an ignition tube of a heat-resistant material having a length larger than the length of said sheath and an outside diameter smaller than said diameter of said through hole, said ignition tube having one open end an opposite sealed end, and a portion close to said sealed end and extending through said through hole into said sheath; and (c) a slide block having an outside diameter smaller than inside diameter of said sheath and fixed coaxially to and around said ignition tube within said sheath, said slide block having a sliding O-ring mounted on an outer periphery thereof, said through hole in said closed end of said sheath being defined by an inner wall on which a sliding O-ring is mounted, said ignition tube being held coaxially with said sheath by said sliding O-rings, said slide block being slidable in said sheath while hermetically sealing a region in said sheath between said slide block and said closed end of said sheath; and (d) a control mechanism composed of an evacuating mechanism, a control gas supply for supplying a control gas, a directional control valve, and a line connected such that said direction control valve is operated selectively to reduce a pressure in said ignition tube through said closed end thereof and to supply the control gas into said ignition tube, and selectively to reduce a pressure in said sheath through a nipple mounted on said sheath closely to the closed end of said sheath and to supply the control gas into said sheath, said slide block being slidably movable in said sheath such that said ignition tube is accommodated said sheath upon a pressure reduction in said sheath, said ignition tube has a length close to a tip end thereof exposed out of said sheath to cause the tip end to enter said region in response to the supply of the control gas into said sheath, the pressure in said ignition tube being reduceable when said tip end of the ignition tube is exposed out of said sheath, and the pressure in said ignition tube being restorable when said ignition tube is housed in said sheath.

2. A method of igniting a plasma torch to generate a high-temperature plasma fire of high purity by applying a high-frequency energy produced by a high-frequency induction coil wound around a region of a tube to a core gas introduced into the tube, said method comprising the steps of:

(a) providing an ungrounded and displaceable ignition element;

(b) positioning said ignition element in a flow of the core gas in said region for ignition;

(c) thereafter igniting the core gas which has been given a high-frequency energy and excited into a plasma; and (d) retracting said ignition element away from the high-frequency energy region immediately after the core gas has been ignited so as to be separated from a high-temperature plasma fire;

wherein said ignition element comprises a hollow and thin ignition tube of a heat-resistant material in which a pressure is reduced, the arrangement being such that a glow discharge will be generated in said ignition tube by the high-frequency energy to ignite the core gas outside of said ignition tube into the plasma, and wherein the pressure in said ignition tube can be reduced, the pressure in said ignition tube being reduced when the core gas is ignited, and being restored to eliminate the glow discharge in said ignition tube.

3. An apparatus for igniting a plasma torch to produce a high-temperature plasma fire of high purity, comprising an ignition mechanism for igniting a plasma torch to generate a high-temperature plasma fire by applying a high-frequency energy produced by a high-frequency induction coil wound around a region of a tube to a core gas introduced into the tube, said ignition mechanism comprising:

(a) a sheath having a predetermined length and a predetermined inside diameter, said sheath having one end closed by a cap of a hermetically sealed construction and disposed out of said tube, and an opposite open end positioned in the vicinity of said region of the tube;

(b) an ignition element in the form of an ignition rod of metal having a length smaller than the length of said sheath and an outside diameter smaller than said inside diameter of said sheath; and (c) a displacement mechanism composed of a tension coil spring having one end depending from a support on an inner wall surface of said cap and having a predetermined spring constant, a slider doubling as a counterweight and having one end to which an opposite end of said tension coil spring is fixed and an opposite end to which an end of said ignition rod is fixed, said slider having a circumferential surface having a diameter smaller than the inside diameter of said sheath, and a gas supply unit composed of a drive gas supply for supplying a gas which is the same quality as that of said core gas to drive said slider, a line connecting said drive gas supply and a nipple on said cap, and a directional control valve connected in said line, said slider being slidably displaceable in said sheath such that said ignition rod fixed to the opposite end of said slider is normally housed in said sheath, and when a gas pressure is excess of a spring force of said tension coil spring is introduced into a chamber of the sheath in which said tension coil spring is disposed, said ignition rod is displaced by said slider to cause the tip end of said ignition rod to enter said region of said tube;

wherein said ignition mechanism includes a discharge eliminating gas supply unit composed of a gas supply for supplying a gas less ignitable than said core gas, a line connecting said gas supply and said line of said drive gas supply unit downstream of said directional control valve, and a valve connected in said line of said discharge eliminating gas supply unit, the discharge eliminating gas flowing at a rate smaller than the rate of flow of the drive gas, the arrangement being such that when the discharge occurs, the discharge eliminating gas is introduced into said chamber of said sheath, and allowed to leak through a clearance between an outer periphery of said slider and an inner wall surface of said sheath and flow along the ignition rod fixed to the opposite end of said slider toward the open end of said sheath within the sheath, while the pressure of the gas introduced in said chamber is prevented from disturbing the displacement of said slider.

* * * * *